United States Patent

Weisser, Jr.

[19]

[11] Patent Number: 5,838,774
[45] Date of Patent: Nov. 17, 1998

[54] TELEPHONE POLLING METHOD

[75] Inventor: Frank J. Weisser, Jr., Atlanta, Ga.

[73] Assignee: BellSouth Corporation, Atlanta, Ga.

[21] Appl. No.: 673,916

[22] Filed: Jul. 1, 1996

[51] Int. Cl.[6] .................................................. H04M 11/00
[52] U.S. Cl. .................................. 379/92.02; 379/92.03; 379/92.01
[58] Field of Search ................................ 379/207, 67, 88, 379/89, 201, 92.01, 92.02, 92.03, 92.04, 112, 114; 455/2; 348/1–3

[56] References Cited

U.S. PATENT DOCUMENTS

| | | | |
|---|---|---|---|
| 5,519,768 | 5/1996 | Moquin et al. | 379/100 |
| 5,675,635 | 10/1997 | Vos et al. | 379/113 |

FOREIGN PATENT DOCUMENTS

| | | | |
|---|---|---|---|
| 08088689 | 2/1996 | Japan . | |
| WO 96/32818 | 10/1998 | WIPO . | |

OTHER PUBLICATIONS

Von Konrad Kornblum, *Auf dem Weg zum intelligenten Dienst,* Funkshau, vol. 63, No. 17, pp. 50–53, Aug. 9, 1991 (in German with English language translation attached).

Naoki Takeda and Ryoji Takaichi, *Initiated Telegong and Teledome Services,* NTT Review, vol. 6 No. 4, pp. 53–58 (in English).

Ljungstrom, A., *Provision of Intelligent Network Services Also to Users at Electromechanical Exchanges,* First International Conference on Intelligent Networks, pp. 191–195, Mar. 14–17, 1989, Bordeaux, France (in French with English language translation).

Sable, E.G., et al, *Evolution to the Advanced Intelligent Network,* Intelligent Networks, the Path to Global Networking, Proceedings of the International Council for Communication Intelligent Networks Conference, pp. 103–113, Tampa, Florida May 4, 1992 (in English).

Schulz, K, et al, *Strategy For and Implementation of the Intelligent Network,* International Switching Symposium, 1990, (ISS '90), vol. 4, pp. 47–55, May 28, 1990—June 1, 1990, Stockholm (in English).

*Primary Examiner*—Curtis A. Kuntz
*Assistant Examiner*—Melur Ramakrishnaiah
*Attorney, Agent, or Firm*—J & A

[57] ABSTRACT

In an intelligent switched telephone network, a telephone polling method is provided wherein a call made in response to a telephone based polling service is processed and disconnected without connection of the call to the subscriber of the polling service. A call received in the network and directed to a number associated with a telephone polling service has its identification information read and compared to entries in a database of subscriber information for a matching entry. The call is tabulated in the database as a response to the polling service poll or survey. If desired by the polling service subscriber, the calling party may be provided with a caller interaction program through which the calling party may select from a variety of responses. If desired, the calling party may be provided with a call termination announcement.

20 Claims, 7 Drawing Sheets

TELEPHONE POLLING METHOD

FIELD OF THE INVENTION

This invention relates in general to telephony and more particularly relates to a telephone polling method in an Advanced Intelligent Network.

BACKGROUND OF THE INVENTION

In recent years, the telecommunications industry has identified a demand from subscribers for telephone polling services. A typical telephone polling service is exemplified by a local television station advertising that its viewers may call telephone number A to vote yes or telephone number B to vote no regarding some current event or controversy. Telephone subscribers use such polling services in order to get a quick public survey or opinion poll on a variety of issues. Often a television or radio station will publish the results of the poll at the end of a particular broadcast. Subscriptions for such polling services may come from a variety of persons, groups, or companies. The advertisement of the number or numbers to call in order to participate in the poll may be advertised in many different ways such as the aforementioned television and radio broadcasts, in newspapers, on billboards, or any commonly used advertising media.

Currently, public telecommunications networks support such polling services by routing calls directly to advertised polling services numbers where each call must be answered. Unfortunately, this method is inefficient from the perspective of telecommunications system utilization and subscriber demand. Under the current system, a participating caller calls an advertised number in order to cast a vote in a given survey or poll. The call is routed to a subscriber based collection site and answered. The subscriber may answer the call and tabulate the response with some automated means such as an answering machine, or the call may be answered by subscriber personnel. The problem with this type of polling service operation is that each call must be routed from the caller to the advertised polling service number through the telecommunication network via voice circuits. Not only does such a practice "tie up" limited voice circuit capability, but the requirement of answering each call means that the rate at which voting can be done is limited by the number of called lines provided by the polling service originator and the speed of the answering equipment or personnel. Therefore a need exists for a more efficient method of conducting telephone based polling services.

Because the modern public switched telephone network (PSTN) forms the basic environment of the present invention, it is advantageous to briefly discuss operation and capabilities of the modem public switched telephone network. The modem public switched telephone network has separate paths for voice circuits (or other customer-utilized communication circuits) and for information transmitted throughout the network that controls the connection and disconnection of the voice circuits. The modem public switched telephone network is contrasted with earlier versions of public switched telephone network in which tone signals were transmitted over the same circuits used as voice paths to control set-up and takedown of calls, to create billing records, and to provide other control for the telephone network.

In the late 1970s and early 1980s, American Telephone & Telegraph Company (AT&T) developed early versions of common channel interoffice signaling (CCIS). CCIS is essentially a network architecture for a switched telephone network in which information about a telephone call is transmitted over high speed data links that are separate from the voice circuits that are used to transmit the signals of the call itself. Early in the development of common channel interoffice signaling, it was recognized that the interoffice data signaling links could be designed to provide high speed digital data that could first determine whether a call could be completed prior to assigning trunk capacity to set up the voice link. Thus, with common channel interoffice signaling the identity of the called number can be transmitted over the interoffice signaling data links from the originating central office to the terminating central office.

The terminating central office is the central office that services the called number. If the called number is busy, data representing this information is transmitted back over the interoffice signaling link to the originating central office that locally provides an audible busy signal to the caller. Therefore, no long distance trunk capacity is occupied during this process, and the voice circuits remain free for other uses. If the called number is not busy, various devices in the network respond to the information about this call to assign interoffice trunks to set up a connection for the call. While the call is being set up, the originating central office, based on a signal from the terminating central office, returns an audible ring back tone to the caller. Once the called number is answered, an answer signal is passed from the terminating central office to the originating central office, the ring back tone is terminated, and the call is completed.

Figure 1:
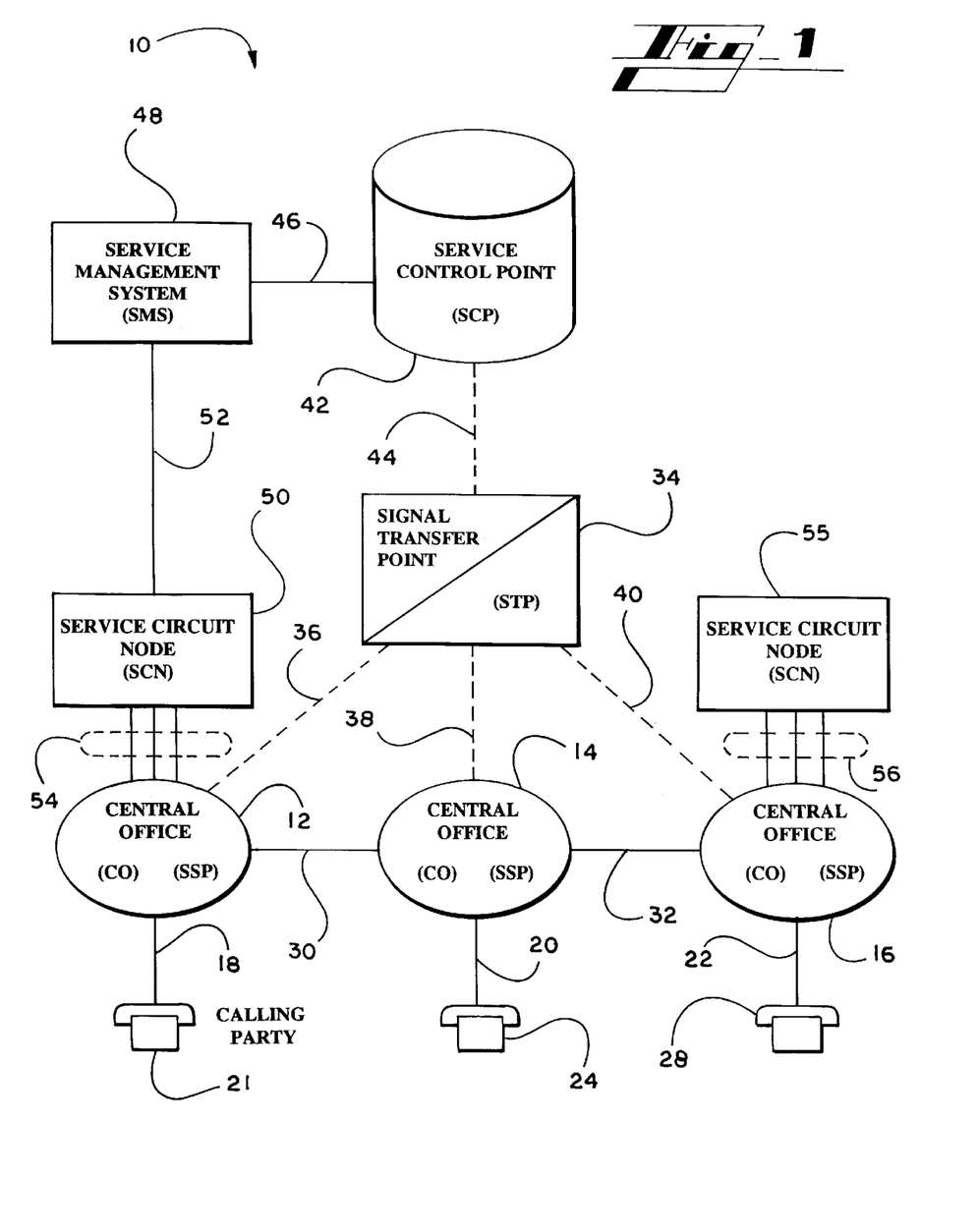
FIG. 1 is a block diagram of the existing Advanced Intelligent Network in a telephone system in the United States which forms the environment of the present invention.

The public switched telephone network which evolved in the 1980s was designed by AT&T and includes the concept of the "Intelligent Network." The intelligent network concept was expanded through industry consensus in the early 1990s and has become the Advanced Intelligent Network. Such an Advanced Intelligent Network is shown in FIG. 1. The Advanced Intelligent Network, as a part of the modern public switched telephone network, forms the environment of the present invention. Therefore, it is helpful to briefly describe the AIN and its architecture in order to have a complete understanding of the objects and advantages of the present invention.

The AIN enables telecommunications call control and database access from any computer or switching system connected to the Signaling System 7 (SS7) network. The Signaling System 7 (SS7) network refers to the current implementation of the CCIS control network used in the United States. The Advanced Intelligent Network (AIN) is a standard call control protocol which uses the SS7 network for message transport.

Much of the intelligence and the basis for many of the new enhanced features of the network reside in the local service control point (SCP). As is known to those skilled in the art, service control points are physically implemented by relatively powerful fault tolerant computers. Typical implementation devices include the Star Server FT Model 3200 or the Star Server FT Model 3300, both sold by AT&T. The architecture of these computers is based on Tandem Integrity S2 and Integrity S1 platforms, respectively. In most implementations of a public switched telephone network, service control points are also provided in redundant mated pairs in order to assure reliability and continued operation of the network.

The computing devices implementing service control points typically are large and powerful computing machines. Among the functions performed by the service control points is maintenance of network data bases used in providing custom services. Service control points include data bases that identify customers requiring particular services. In order to keep the processing of data and calls as simple and generic as possible at switches, a relatively small set of triggers are defined at the switches for each call. A trigger in the network is an event associated with a particular subscriber line or call that generates a data packet to be sent to a service control point. The trigger causes the service control point to query its data base to determine whether some customized calling feature or custom service should be implemented for this particular call, or whether conventional plain dialed-up telephone service (POTS) should be provided for the call. The results of the data base inquiry are sent back to the switch from the SCP. The return message includes instructions to the switch as to how to process the call. The instruction may be to take some special action as a result of a customized calling service or custom feature. If a "continue" message is received at the switch from the SCP, the call is treated as a POTS-type call. In response to receiving the latter type message, the switch will move through its call states, select the call digits, and may generate further messages that will be used to set up and route the call, as described herein above.

Accordingly, there is a need in the art for a telephone polling service that does not require voice circuit connection between each participating caller and the polling service subscriber. Further, there is a need in the art for a telephone polling service that does not require subscriber on-premises equipment or personnel. Additionally, there is a need in the art for a high volume telephone polling service.

SUMMARY OF THE INVENTION

The present invention satisfies the above described needs by providing a telephone polling method in an Advanced Intelligent Network (AIN), wherein the polling method facilitates receipt, tabulation, accumulation, and distribution of polling responses with minimum use of voice circuits and subscriber on-premises equipment or personnel.

Generally described, one aspect of the present invention provides a telephone polling method in an Advanced Intelligent Network wherein the Advanced Intelligent Network includes a switch, a service circuit node, and a service control point. The service control point is functionally connected to the switch and the service circuit node, and the service control point includes a database of subscriber information. In the method of the present invention, a call from a calling party directed to the polling service is detected at the caller's switch. The switch determines from the called number that SCP support is needed and identification information associated with the call is sent from the switch to the service control point. The identification information is read at the service control point to determine whether the call was directed to the polling service. Once the service control point has read the identification information, the database of subscriber information is searched for an entry corresponding to the polling service. One response corresponding to the call is tabulated and added to an accumulating total. The accumulated total is stored in the database at the entry corresponding to the polling service for later retrieval by the subscriber of the polling service.

Preferably the method of the present invention also sends call termination instructions from the service control point to the switch once the response has been tabulated. The termination instructions cause the switch to disconnect the call. Prior to disconnecting the call, the switch may play a terminating announcement. Alternately, the service control point can route the tabulated call to a service circuit node where a subscriber designed call termination announcement can be played to the caller whereupon the service circuit node disconnects the call. Subscriber refers to the purchaser of the local polling service (e.g. a television station).

In another embodiment of the present invention, an interactive program operates at the service control point and/or at the service circuit node. The interaction program permits a calling party to choose one of a set of responses provided by the polling service. In accordance with this embodiment, a caller interaction program is initiated at the service control point in response to determining from the identification information and the subscriber database that an interaction program is desired. The interaction program instructs the switch to play announcements to the calling party, and the service control point receives responses from the switch that are indicative of the caller's responses to the announcements.

Alternatively, the interactive program may be performed at the service circuit node. Prior to the step of tabulating one response at the service control point, the service control point routes the call to a service circuit node and instructs the service circuit node to run a caller interaction program. The service circuit node initiates the caller interaction program and plays announcements to the caller. The responses to the announcements from the caller are tabulated. The tabulated results are then sent to the service control point, the service management system, or retained by the SCN.

Another aspect of the present invention provides for a method of operating a polling service utilizing a designated switch to which all calls for a given polling service may be routed. The designated switch may provide information associated with those calls to the service control point. Described more particularly, this aspect of the present invention provides a method for operating a polling service in an Advanced Intelligent Network, including a switch, a service circuit node and a service control point. The service control point is functionally connected to the designated switch and the service circuit node. The service control point includes a database of subscriber information. After a first switch receives a call from a calling party directed to a number associated with the polling service, the first switch routes the call to the number at the designated switch corresponding to the number called. Receipt of the call at the designated switch activates a terminating trigger associated with the polling service number. The designated switch, in response to the terminating trigger, sends identification information associated with the call to the service control point. The service control point reads the identification information for the presence of information directed to the polling service and searches the database of subscriber information for an entry corresponding to the polling service. Upon finding the entry, the service control point tabulates one response corresponding to the call, adds the response to a cumulative total, and stores the cumulative total in the database at the entry corresponding to the polling service.

In a preferred embodiment of this second aspect, the service control point sends termination instructions to the designated switch. In response to the termination instructions, the designated switch instructs the first switch to disconnect the call and, if desired, play a disconnect announcement. Alternately, the service control point may route the call to a service circuit node and may subsequently send termination instructions to the service circuit node. Prior to disconnecting the call, the service circuit node may optionally play a subscriber designed announcement.

Another embodiment of this second aspect of the present invention allows for initiation of an interactive program which will permit a calling party to choose one of a set of responses provided by the polling service. Preferably, according to this embodiment, prior to the step of tabulating one response, the service control point initiates a caller interaction program. The caller interaction program instructs the triggering switch to play announcements to the calling party. In response to the announcements, the calling party chooses a response from a set of responses. When the switch receives the response from the calling party, it sends the response to the service control point. The interactive program may also be performed at a service circuit node selected by the SCP.

Additionally, if desired by the subscriber of the polling service, the present invention may prevent repeat voting (by the same calling party) by blocking tabulation of the calling party's responses where the calling party has already called. This is achieved by recording the calling party's telephone number and ignoring subsequent calls from the same number. Also, recording the calling party's telephone number enables the present invention, if desired, to provide the subscriber with demographic information associated with the calling party.

In the present invention the subscriber of the polling service may retrieve the cumulative total from the service management system. The service management system retrieves the cumulative total from the service control point or from the service circuit node.

Accordingly, it is an object of the present invention to provide an efficient method for operating a polling service.

It is another object of the present invention to provide a method of operating a telephone based polling service with minimum use of voice circuit connections.

It is another object of the present invention to provide a method of operating a telephone based polling service which will facilitate greater efficiency of collection of polling service results.

It is another object of the present invention to provide a method of operating a telephone based polling service which will allow for increased volume of caller participation.

These and other objects, features, and advantages of the present invention will become apparent upon review of the following detailed description and the attached drawings.

BRIEF DESCRIPTION OF THE DRAWINGS

FIG. 2, comprising

FIG. 3, comprising

DETAILED DESCRIPTION

Stated generally, the method of the present invention allows a call directed to a local polling service to be processed prior to call completion. In the following description, the term subscriber is used to indicate the person or entity who or which has requested the polling service and the information collected therefrom. The terms caller and calling party are used to indicate the party calling the advertised polling service number in order to respond to the polling service.

In a preferred embodiment of the present invention, a dialing plan trigger associated with the local polling service is assigned to the call at the calling party's local switch. The dialing plan trigger assigned at the calling party's switch sends a query to the service control point (SCP) which searches its database for the polling service corresponding to the query. The SCP then tabulates the caller's response and sends call termination instructions to the calling party's switch. As will be discussed in detail below, a caller interaction program may also be offered which allows the caller to choose among a variety of responses. Additionally, as will be discussed below, a service circuit node may be utilized to handle much of the processing of the communication. As will be understood, this embodiment of the present invention allows the communication to be processed without physically routing the call to any terminating location.

In another embodiment of the present invention, dialing plan triggers corresponding to the polling service are assigned to the call at a second or terminating switch. The terminating switch then sends a query to the SCP for processing as described above. This embodiment requires calls directed to a local polling service to be routed from the calling party's switch to a terminating switch, but has the advantage that a single terminating switch will be responsible for assigning all dialing plan triggers associated with the polling service as opposed to triggers being assigned at each calling party switch. This terminating switch trigger would also be necessary to support originating switches which do not have AIN trigger capability.

Description of the Preferred Environment for the Present Invention

Referring now to the drawings, like numbers reference like parts or steps, in the several figures, and for the purpose of clarity, numbers not accompanied by any designation will refer to components or parts shown in FIG. 1, and numbers preceded by the word "step" will refer to steps shown in FIGS. 2 and 3. FIG. 1 of this specification is a block diagram representing at least part of the Advanced Intelligent Network (AIN) 10 of a typical local exchange carrier. The components thereon are well known to those skilled in the art. A plurality of SSP central office switches is provided in a typical public switched telephone network. These are indicated as SSP central office switches 12, 14, and 16 in FIG. 1. The number of SSP central office switches depends on the number of subscribers to be served by the public switched telephone network. SSP is an acronym for Service Switching Point.

An SSP central office switch includes Advanced Intelligent Network functionality. The SSP central office switch is equipped with appropriate hardware and software so that, when a set of predetermined conditions are detected, the SSP central office switch will initiate a trigger for a predetermined state of a call on a subscriber line, generate the trigger as an appropriate message to be sent out over the AIN, and suspend handling of a call until it receives a reply from the network instructing it to take certain action. As discussed in the background section, above, a trigger is an event associated with a particular call (in this case, associated with the local polling service) that generates a data packet to be sent to the service control point (SCP). The SSP central office switch will have a default task to execute if a time out occurs and no response is provided by the AIN to the query made by the SSP central office switch.

SSP central offices switches 12, 14, and 16 have a plurality of subscriber lines 18, 20, and 22 connected thereto. Typically, the number of subscriber lines for each SSP central office switch will be on the order of 10,000 to 70,000 lines. Each of subscriber lines 18, 20, and 22 is connected to a terminating piece or pieces of customer premises equipment that are represented by a like plurality of telephone sets 21, 24, and 28. Interconnecting SSP central office switches 12, 14, and 16 are a plurality of trunk circuits indicated as 30 and 32 in FIG. 1. These are the voice path trunks that interconnect the central offices 12, 14, and 16 and over which calls are connected when completed. It should be understood that central office trunking in a typical urban environment is not limited to a daisy chain arrangement implied by FIG. 1. In other words, in a typical network, trunk circuits will exist between SSP central office switch 12 and SSP central office switch 16. Therefore, when a local call is made between two central offices and if a direct trunk connection that is not busy exists between the offices, the network will assign that trunk to the completion of that particular call. If there is no direct trunking between the two central offices or if the direct trunks are all in use, the call will be routed along trunks from the originating central office to at least one other central office, and through subsequent trunk connections on to the terminating central office.

This general architecture is magnified when a wider geographic area that includes multiple local exchange carriers is considered. In that case, the only significant difference is that certain inter-exchange carrier switches that switch nothing but long distance trunk circuits are included.

Most of the intelligence of the Advanced Intelligent Network resides in the remaining components shown in FIG. 1. These are the computers and switches that embody the current version of the common channel interoffice signaling scheme mentioned in the background section above. Each of SSP central office switches 12, 14, and 16 is connected to a local signal transfer point (STP) 34 via respective SS7 links 36, 38, and 40. Currently, these SS7 links are 56 kilobit per second bi-directional data links employing a signaling protocol referred to as Signaling System 7 (SS7). The SS7 protocol is well known to those skilled in the art and is described in a specification promulgated by the American National Standards Institute (ANSI).

The SS7 protocol is a layered protocol wherein each layer provides services for layers above it and relies on the layers below to provide it with services. The protocol employs packets that include the usual beginning and terminating flags and a check bit. Additionally, a signal information field is provided that includes a variable length user specific data field and a routing label. A service information octet is provided that identifies a priority of the message, the national network of the destination of the message, and identifies the entity that created the message. Also, certain control and sequence numbers are included within the packet, the uses and designations of which are known to those skilled in the art and described in the above referenced ANSI specification.

All of the SS7 data packets from the SSP central office switches go to a signal transfer point (STP) 34. Those skilled in the art will recognize that signal transfer point 34 is simply a multi-port high speed packet switch that is programmed to respond to the routing information in the appropriate layer of the SS7 protocol, and route the packet to its intended destination. The signal transfer point is not normally, per se, the destination of a packet, but merely directs traffic among the other entities on the network that generate and respond to the data packets. It should be noted that signal transfer point devices such as STP 34 are conventionally installed in redundant pairs within the network so that if one device fails, its mate takes over until the first STP is able to return to service. In practice, there are redundant data links between each of SSP central office switches 12, 14, and 16 for enhanced reliability. For the sake of simplicity of the drawings, the redundant devices have not been illustrated in the drawing figures in this specification.

As previously discussed, much of the intelligence, and the basis for many of the new custom features of the network reside in the local service control point (SCP) 42 that is connected to signal transfer point 34 via SS7 link 44. As is known to those skilled in the art, service control points, such as SCP 42, are physically implemented by relatively powerful fault tolerant computers. Typical implementation devices include the Star Server FT Model 3200 or the Star Server FT Model 3300, both sold by American Telephone & Telegraph Company. The architectures of these computers are based on Tandem Integrity S2 and Integrity S1 platforms, respectively. In most implementations of a public switched telephone network, service control points are also provided in redundant mated pairs in order to assure reliability and continued operation of the network.

The computing devices implementing service control points typically accommodate one to twenty-seven disk drives ranging from 300 megabytes to 1.2 gigabytes per drive, and have main memory on the order of 24 to 192 megabytes. Thus, it will be appreciated that these are large and powerful computing machines. Among the functions performed by the service control points are maintenance of network data bases used in providing custom services. The computers embodying the SCPs, such as SCP 42, can execute at a speed on the order of 17 million instructions per second. Using the SS7 protocol, this translates to at least 50 to 100 transactions (query/response pairs) of network messages per second.

Service control point computers were initially introduced into the network to handle the necessary translations and billing transactions for the implementation of 800 number service, that is, toll free (to the caller) long distance service. An 800 number subscriber has at least one dial-up line number that is to be called when a call to that subscriber's 800 number is placed. There is no physical central office or area of the country that corresponds to the 800 area code. It is significantly more economical to provide a few central locations at which the lookup of the directory number for an 800 call can be made than to provide the translation information redundantly at many central office switches. Currently, service control points also include data bases for credit card call transactions.

Also, service control points, such as SCP 42, include data bases that identify particular service customers. In order to keep the processing of data and calls as simple and generic as possible at central office switches, such as SSP central office switches 12, 14, and 16, a relatively small set of triggers are defined at the SSP central office switches for each call. The triggers cause the service control point 42 to query its data base to determine whether some customized calling feature or custom service should be implemented for this particular call or whether conventional plain dial-up telephone service should be provided for the call. The results of the data base query are sent back to the switch from SCP 42 through STP 34. The return packet includes instructions to the SSP central office switch as to how to process the call. The instruction may be to take some special action as a result of a customized calling service or custom feature or may simply be an indication that there is no entry in its data base that indicates that anything other than plain telephone service should be provided for the particular call. In response to receiving the latter type message, the SSP central office switch will move through its call states, collect the called digits, and generate further packets that will be used to set up and route the call, as described herein. Similar devices for routing calls among various local exchange carriers are provided by regional signal transfer points (not shown) and regional service control points (not shown).

The service control point 42 is connected via data link 46 to a service management system (SMS) 48. The regional service control points (not shown) are also connected to the service management system 48. The service management system 48 is also implemented by a large general purpose digital computer and interfaces to business offices of the local exchange carrier and to various operations support systems. The service management system 48 downloads information to the data bases of the service control point 42 when subscribers modify their ensemble of AIN services. Similarly, the service management system 48 downloads, on a non real-time basis, billing information that is needed in order to appropriately invoice telephone company subscribers for the services provided.

The modern Advanced Intelligent Network 10 also includes service circuit nodes (SCNs) such as service circuit nodes 50 and 55 shown in FIG. 1. Those skilled in the art will be familiar with service circuit nodes, which are physically implemented by the same types of computers that embody the service control point 42. In addition to the computing capability and data base maintenance features, service circuit nodes 50 and 55 use ISDN lines and may include DTMF signal recognition devices, tone generation devices, voice synthesis devices and other voice or data resources. As shown in FIG. 1, the connection is through the SSP. For example SCN 50 is connected to SCP 42 via ISDN links 54 to SSP 12, ISDN/SS7 protocol conversion in SSP 12, and SS 7 links 36 and 44. Additionally, service circuit node 50 is connected to service management system 48 via a data link 52 that services the service circuit node 50 in essentially the same way it services SCP 42. It is understood that service circuit node 55 may also be connected to a service management system, but such connection is not shown in FIG. 1. While service circuit nodes 50 and 55 are physically quite similar to SCP 42, there are some important differences in the uses to which they are put. Service control points, such as SCP 42, normally implement high volume routing services, such as call forwarding and 800 number translation and routing. They are also used for maintenance of and providing access to high volume data bases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

By contrast, service circuit nodes, such as service circuit nodes 50 and 55, are used principally when some custom feature or service is needed that requires an audio connection to the call or transfer of a significant amount of data to a subscriber over a switched connection during or following a call. As shown in FIG. 1, service circuit nodes 50 and 55 are typically connected to one or more (but normally only a few) SSP central office switches via Integrated Service Digital Network (ISDN) links shown as lines 54 and 56. Thus, services that are implemented during a call (i.e., after completion of ringing or called subscriber pick up) employ the facility of a service circuit node such as service circuit nodes 50 and 55.

Operation of the Present Invention in the Preferred Environment

Referring now to FIGS. 1 and 2, in the preferred embodiment of the present invention, generally described above, a calling party calls a number corresponding to a particular polling service to which the calling party desires to respond. It should be understood that the subscriber of the polling service may designate more than one number which may correspond to alternative voting choices. Alternatively, the subscriber may designate only one number which will provide the calling party with an interactive program which will, in turn, allow the calling party to vote from a variety of choices. The caller interaction program, which will be discussed in detail below, may also be utilized where the subscriber has designated multiple numbers and where the subscriber wishes to provide multiple vote choices at any particular number.

In connection with handling a call made by a calling party, assume the calling party dials the polling service number from standard telephone set 21 as shown in FIG. 1. The calling party's telephone set 21 establishes a connection to SSP central office switch 12 via line 18. The SSP central office switch 12 upon receiving the dialed number at step 100, shown in FIG. 2a, assigns a dialing plan trigger associated with the polling service number being called by the calling party. In response to the assigned trigger, the SSP central office switch 12 creates and transmits at step 110 a packet of data to the SCP 42 via SS7 link 36, signal transfer point 34, and SS7 link 44. The packet represents a query to the SCP 42 to determine whether the dialed number requires any sort of custom services or special handling. In this case, the service control point 42 queries its database at step 120 and determines that the dialed number is associated with the polling service. If the SCP 42 determines the dialed number is not associated with the polling service, then the SCP 42 will initiate some other call protocol at step 125 according to the data packet received from SSP central office switch 12.

Figure 2A:
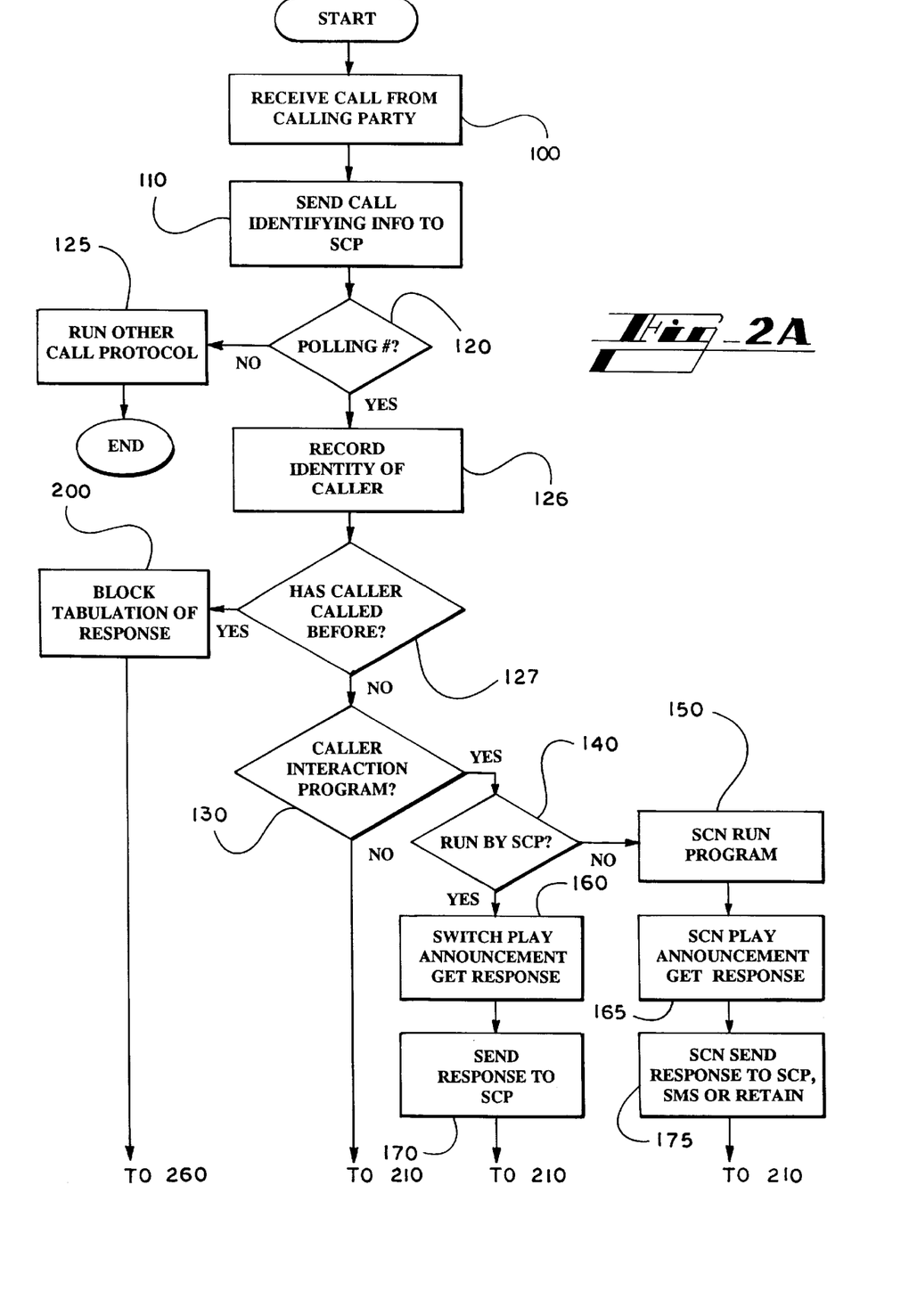
FIGS. 2a, 2b, and 2c, is a flow chart illustrating the preferred method of a first embodiment of the present invention.

After the SCP 42 determines the call is directed to the polling service at step 120, the SCP 42 then records the identity of the caller from the caller's telephone number at step 126. As is well known to those skilled in the art, the caller's telephone number is included in the dialing plan trigger assigned by the SSP. If the calling party has already responded to this polling service, step 127, the SCP 42 may, if directed by the polling service subscriber, block tabulation of the calling party's response at step 200.

If the calling party has not previously responded to the polling service or if the polling service subscriber has not directed that responses of repeat caller's be blocked, the SCP 42 then determines whether the subscriber has specified a caller interaction program at step 130. If the subscriber has not specified a caller interaction program at step 130, the method follows the "no" branch to step 210 and tabulates the caller's response.

If the subscriber has specified a caller interaction program the method follows the "yes" branch, at step 130, and the method proceeds to step 140. At step 140, the method determines whether the caller interaction program is to be run by the SCP 42 ("yes" branch) or by the SCN 50 ("no" branch). At step 160 the SCP 42 initiates the caller interaction program. The caller interaction program allows the calling party to respond to the polling service by selecting from a variety of responses. The SCP 42 at step 160 will instruct SSP central office switch 12 via SS7 link 44, signal transfer point 34, and SS7 link 36 to play a caller interaction announcement to the calling party via line 18 at telephone set 21. A typical announcement may instruct the caller to press numeral I on telephone set 21 for a "yes" vote or numeral 2 on telephone set 21 for a "no" vote. When the calling party responds to the interactive announcement, another data packet is sent to the SCP 42 from SSP central office switch 12 at step 170 and the calling party's responses will be tabulated by the SCP 42 at step 210. This process of announcement and response may be repeated if more information is desired.

As can be seen in steps 140 and 150 of FIG. 2a, the caller interaction program may be directed from a service circuit node 50. If it is desired that the program be run by the service circuit node 50, then the SCP 42, at step 150, routes the call to the SCN and instructs the service circuit node 50 to run the caller interaction program. The service circuit node 50 plays the caller interaction announcement and receives the calling party's response at Step 165 as described in detail above. SCN 50 then sends the calling party's response to the SCP 42 via ISDN links 54 to SSP 12 and SS7 links 36 and 44, at step 175, and the calling party's responses are tabulated by the SCP at step 210. Alternatively, the SCN 50 may tabulate the responses at step 210 and retain the calling party's response or send the response to the SMS 48 via data link 52. Use of the SCN 50 to run the caller interaction program will be advantageous when the survey or poll to be conducted by the program includes subscriber-specific questions and a variety of audio announcements to the caller.

Figure 2B:
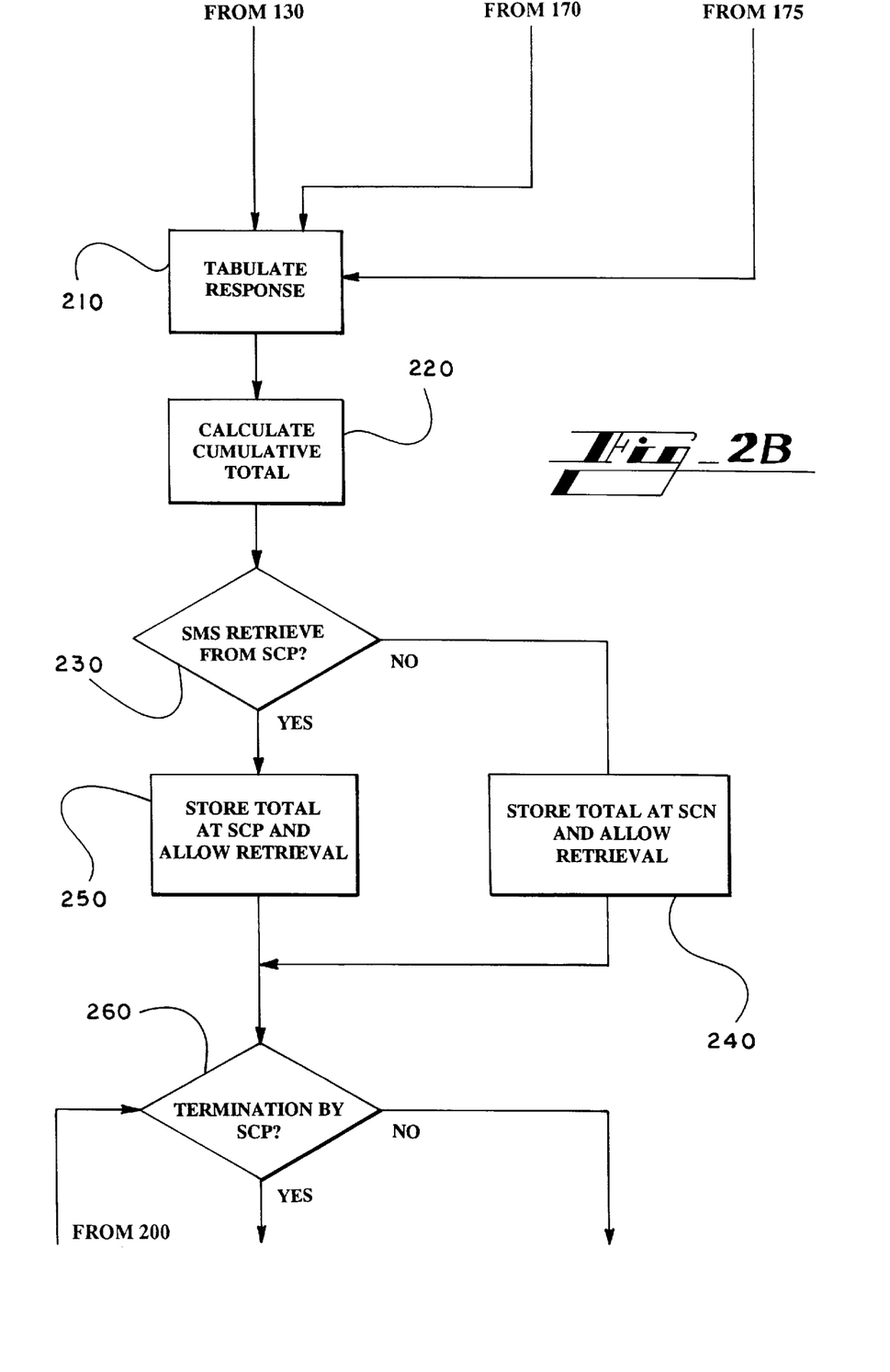

After the SCP 42 tabulates the calling party's response or responses at step 210, the SCP 42 calculates a cumulative total of all responses at step 220. The tabulation of the calling party's response is the same whether or not the caller interaction program is utilized at step 130. Alternatively, as described above, the responses may be tabulated (step 210) and accumulated (step 220) by the SCN 50. At step 230, the method may alternatively store the cumulative total for retrieval by SMS 48 from the SCP 42 (step 250) or store the cumulative total at the service circuit node 50 at Step 240 for retrieval by the SMS 48.

In addition to the steps of tabulating and storing the calling party's response(s), the method may also include the step of recording demographic information about the calling party for provision to the subscriber. It is readily understood that demographic information may include, for example, the calling party's name, age, and address and may be provided to the polling service subscriber by associating the calling party number with its geographic origin or by collecting demographic information from the calling party during the caller interaction program.

As described, the cumulative total of all calling party responses is calculated and may be stored by SCP 42 or at the SCN 50. The present invention allows a subscriber of the polling service to retrieve the results of the telephone polling service from the SMS 48. The SMS 48 may request the data from the SCP 42 or SCN 50 on a scheduled basis or when a subscriber has dialed a number which has been designated to cause the SMS 48 to request the data. For example, assume the subscriber of a particular polling service desires to retrieve the results of the poll or survey conducted by that particular service. The subscriber using a computer such as a personal computer with a commercially available modem could dial a designated number to retrieve the polling data from the SMS 48. As is understood to those skilled in the art, SMS data links connect to SSP central office switches, such as SSP 14 (connection not shown in FIG. 1), and SMS data may be accessed either by a voice call (using a modem) or by public network data service such as X.25 or the Internet. The subscriber using a personal computer as described above could request and receive the data and could watch the data accumulate in real-time.

Figure 2C:
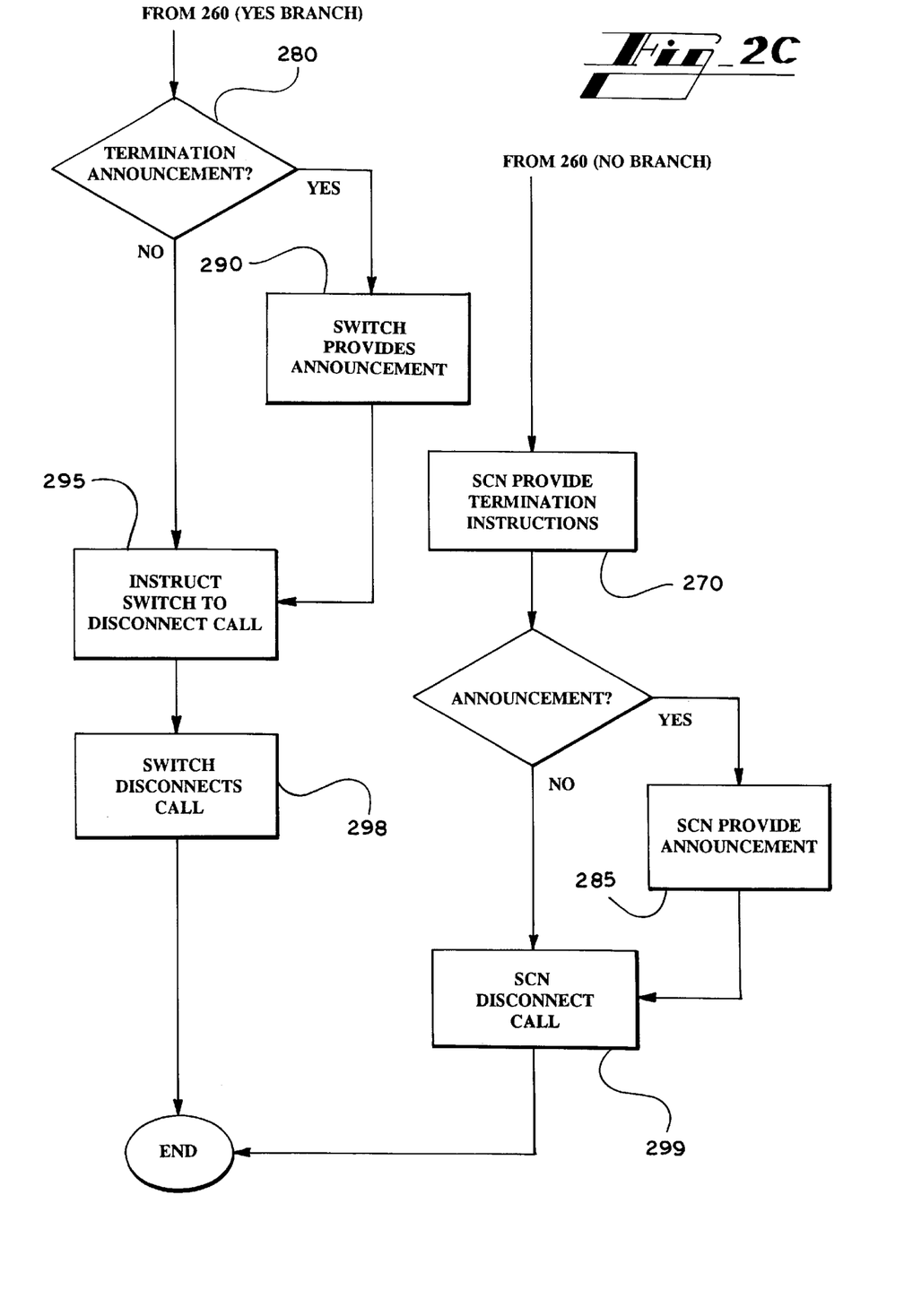

In the present embodiment, after the calling party's response is tabulated and the cumulative total is stored at the SCP 42 or SCN 50, as described above, the SCP 42 determines at step 260 whether call termination instructions will be provided by the SCP 42 ("yes" branch) or by the SCN 50 ("no" branch). If call termination instructions are to be provided by the SCP 42, then the SCP 42 provides call termination instructions at step 280 to SSP central office switch 12. In a preferred form of the present embodiment, the SCP 42 may instruct the SSP central office switch 12, at step 290, to provide an announcement such as "thank you" to the calling party. In response to receipt of the termination instructions from the SCP 42, at step 295, the SSP central office switch 12 disconnects the call at step 298.

Alternatively, the SCP 42 may instruct the service circuit node 50 to terminate the call. This may be done at the time the call is routed to the SCN, or at Step 270. The SCN may provide the calling party with a call termination announcement at step 285. The SCN 50 may then disconnect the call at step 299. Use of the service circuit node 50 for provision of call termination instructions is advantageous when the call termination instructions include a variety of subscriber-specific call termination announcements.

Figure 3A:
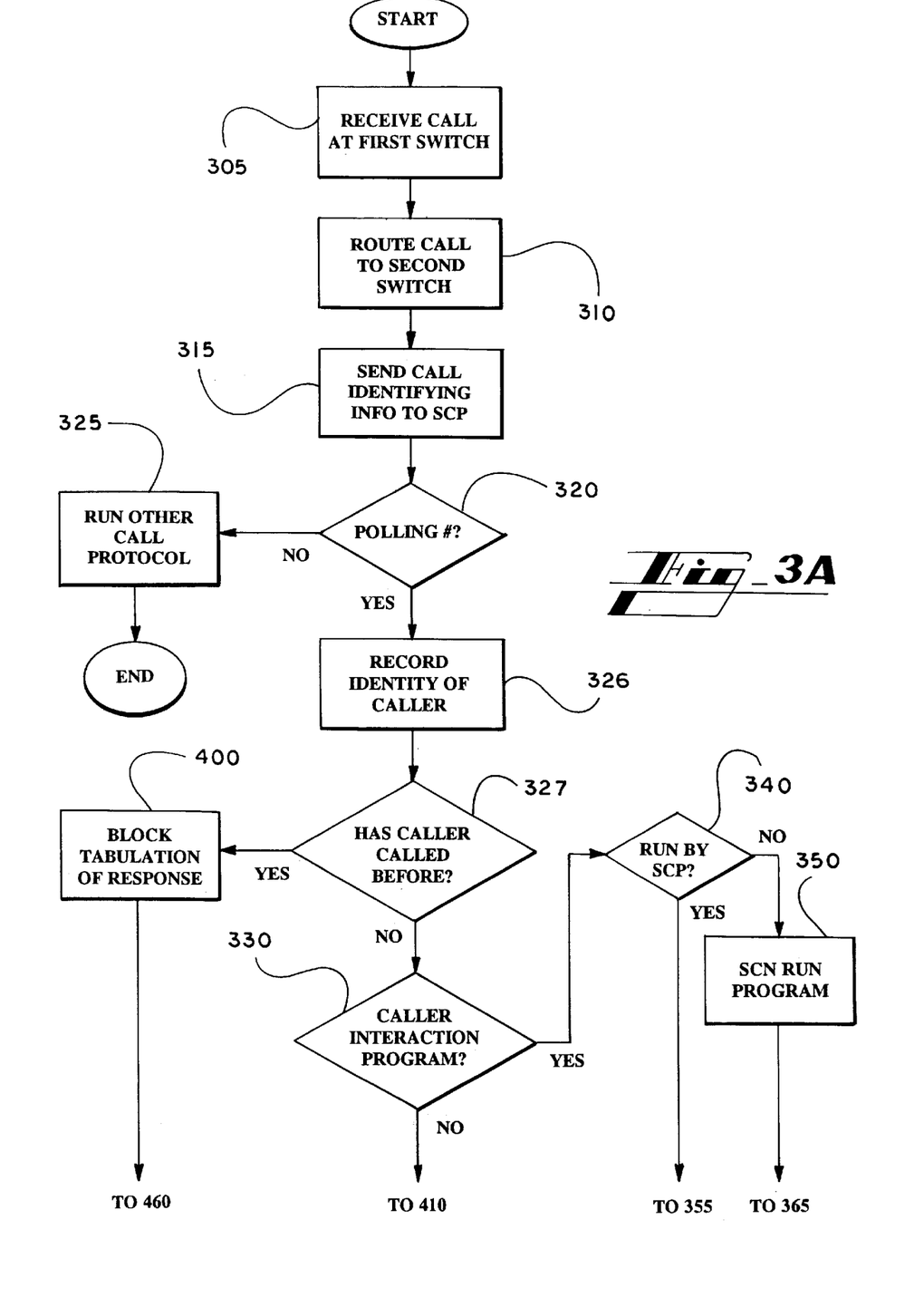
FIGS. 3a, 3b, and 3c, is a flow chart illustrating the preferred method of a second embodiment of the present invention.

Referring now to FIGS. 1 and 3, a second embodiment of the present invention, as generally described above, provides a method of routing all local calls directed to a particular polling service to a second or terminating switch. In connection with handling a call made by a calling party in this embodiment, assume the calling party dials the polling service number from standard telephone set 21 as shown in FIG. 1. The calling party's telephone set 21 establishes a connection to SSP central office switch 12 via line 18. The SSP central office switch 12 upon receiving the dialed number at step 305, shown in FIG. 3a, routes the call to the called number which corresponds to a terminating switch such as SSP central office switch 16 at step 310. The called number exists only in software, and there will be no physical line or telephone associated therewith. Prior to actual completion of the call to SSP central office switch 16, and as is well known to those skilled in the art, a data packet is routed from SSP central office switch 12 to the called number which is resident in software only at SSP central office switch 16 at step 310 shown in FIG. 3a.

The routing of the data packet from SSP central office switch 12 to SSP central office switch 16 uses the SS7 system, as described above for the previous embodiment, and is well known to those skilled in the art. Upon receipt of the data packet from SSP central office switch 12, SSP central office switch 16 assigns a terminating trigger to the called number which triggers a data packet associated with the local polling service to be sent to the SCP 42 at step 315 shown in FIG. 3a. The data packet represents a query to the SCP 42 to determine whether the dialed number requires any sort of custom services or special handling. In this case, the service control point 42 queries its database at step 320 and determines that the dialed number is associated with the polling service. If the SCP 42 determines the dialed number is not associated with the polling service, then the SCP 42 will initiate some other call protocol at step 325 according to the data packet received from SSP central office switch 12 via terminating switch 16.

After the SCP 42 determines the call is directed to the polling service at step 320, the SCP 42 then records the identity of the caller from the caller's telephone number at step 326. As is well known to those skilled in the art, the caller's telephone number is included in the dialing plan trigger assigned by the SSP. If the calling party has already responded to this polling service, step 327, the SCP 42 may, if directed by the polling service subscriber, block tabulation of the calling party's response at step 400.

If the calling party has not previously responded to the polling service or if the polling service subscriber has not directed that responses of repeat caller's be blocked, the SCP 42 then determines whether the subscriber has specified a caller interaction program at step 330. If the subscriber has not specified a caller interaction program at step 330, the method follows the "no" branch to step 410 and tabulates the caller's response.

If the subscriber has specified a caller interaction program the method follows the "yes" branch, and the method proceeds to step 340. At step 340, the method determines whether the interaction program is to be run by the SCP 42 ("yes" branch) or by the SCN 55 ("no" branch). The SCP 42 at step 355 will instruct the terminating switch SSP central office switch 16 to play a caller interaction announcement to the calling party. A typical announcement may instruct the caller to press numeral 1 on telephone set 21 for a "yes" vote or numeral 2 on telephone set 21 for a "no" vote. The calling party's response to the caller interaction program triggers, at step 360, a data packet at central office switch 16 which is sent to the SCP 42 at step 370 where it is processed as described in detail above for the previous embodiment.

As is well understood to those skilled in the art, once SSP central office switch 16 is placed into service because of the use of the terminating trigger, as described above, the calling party's switch plays no further role except to maintain a transmission path from the calling party to the second switch.

As can be seen in steps 340 and 350 of FIG. 3a, the caller interaction program may be directed from a service circuit node 55. If it is desired that the program be run by the service circuit node 55, then the SCP 42, at step 350, routes the call to the SCN 55 and instructs the service circuit node 55 to run the caller interaction program. The service circuit node 55 plays the caller interaction announcement and receives the calling party's response, at step 365, and then sends the response to the SCP 42, at step 375, as described in detail above. Alternatively, the calling party's response may be retained at the SCN 55 or may be sent to the SMS 48 for future retrieval by the subscriber. As described for the previous embodiment, use of the SCN 55 to run the caller interaction program will be advantageous when the survey or poll to be conducted by the program includes subscriber-specific questions and a variety of audio announcements to the caller.

Figure 3B:
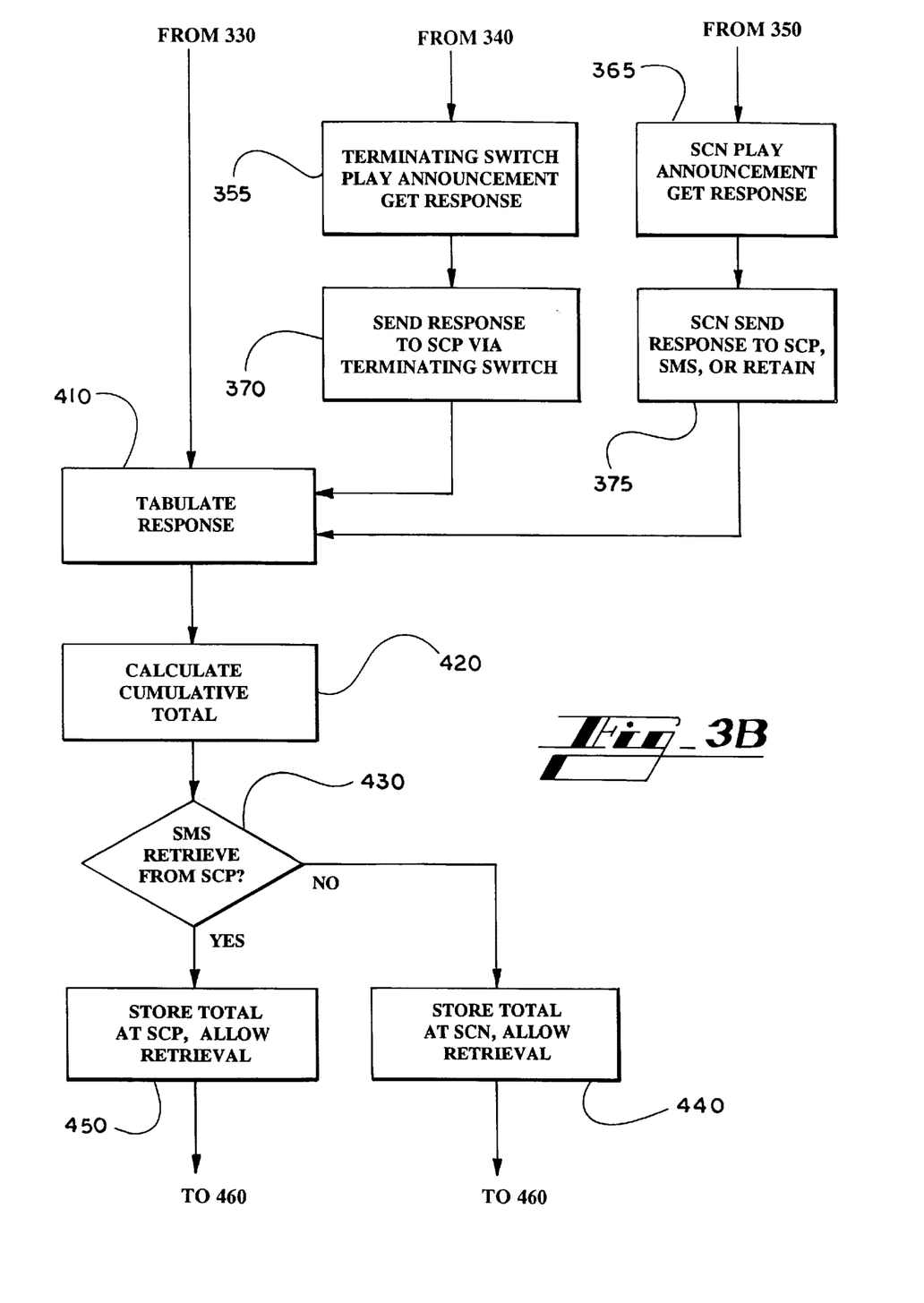

After the SCP 42 tabulates the calling party's response at step 410, the SCP 42 calculates a cumulative total of all responses at step 420. The tabulation of the calling party's response is the same whether or not the caller interaction program is utilized at step 330. And, as described above, the responses may be tabulated (step 410) and accumulated (step 420) by the SCN 55. At step 430, the method may alternatively store the cumulative total for retrieval by the SMS from the SCP 42 (step 450) or store the cumulative total at the SCN 55 for retrieval by the SMS 48 (step 440). Stored responses may be retrieved by the subscriber from SMS 48 as described in the previous embodiment.

As discussed in the previous embodiment, the steps of tabulating and storing the calling party's response(s) may also include recording demographic information about the calling party for provision to the subscriber.

Figure 3C:
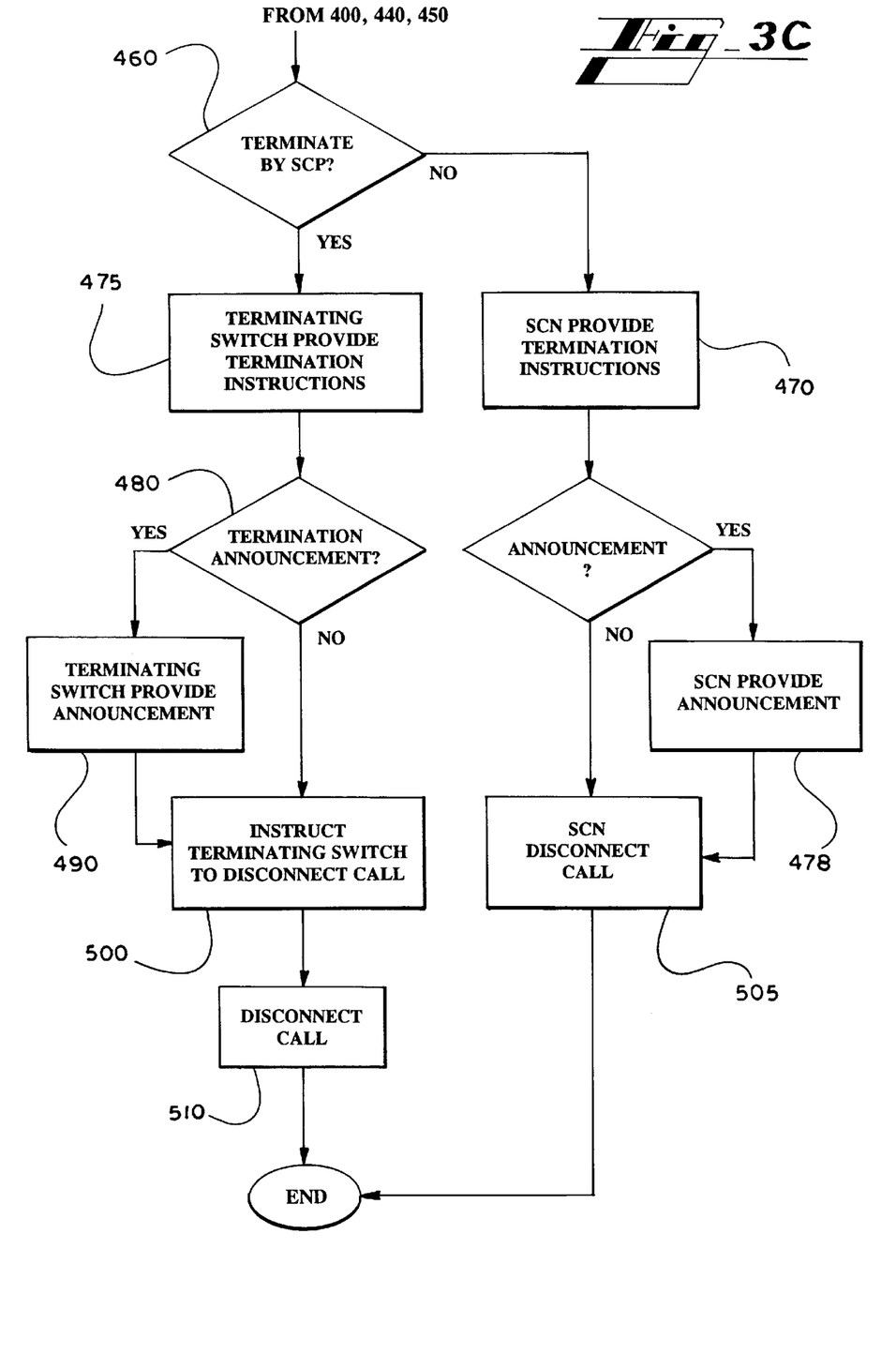

In this embodiment, after the calling party's response is tabulated and the cumulative total is stored at the SCP 42 or SCN 55, as described above, the SCP 42 determines at step 460 whether call termination instructions will be provided by the SCP 42 ("yes" branch) or by the SCN 55 ("no" branch). If call termination instructions are to be provided by the SCP 42, then the SCP 42 provides call termination instructions at step 475 to terminating switch SSP central office switch 16. In a preferred form of the present embodiment, the SCP 42 may instruct the SSP central office switch 16 at step 490 to provide an announcement such as "thank you" to the calling party. In response to receipt of the termination instructions from the SCP 42, the SSP central office switch 16 disconnects the call at step 510.

Alternatively, the SCP 42 may instruct the service circuit node 55 to terminate the call at step 470. The SCN 55 may terminate the call at the time the call is routed to the SCN 55. If desired, the service circuit node 55 may provide the calling party with a call termination announcement at step 478. The SCN 55 may then disconnect the call at step 505. Use of the service circuit node 55 for provision of call termination instructions is advantageous when the call termination instructions include a variety of specific call termination announcements such as thank you announcements from many specified subscribers.

While this embodiment incurs the cost of call routing from the calling party's local switch to the second or terminating switch, only the second or terminating switch will have the triggers associated with the local polling service. This method advantageously eliminates the task of defining and administering local polling service triggers at many different switches and supports those switches which do not have AIN trigger capability.

Advantageously, the present invention provides a telephone polling method that allows response to an advertised polling service without the need for voice circuit connection between the caller and the polling service subscriber. It is therefore able to support a much higher calling rate. Further, the present invention eliminates the need for much of the subscriber's on-premises equipment and personnel. While this invention has been described in detail with particular reference to the preferred embodiments thereof, it will be understood that variations and modifications can be effected within the spirit and scope of the invention as described herein and as defined in the appended claims.

What is claimed is:

1. A telephone polling method for tabulating calls made to a telephone polling number in an Advanced Intelligent Network, including a switch, a service circuit node, and a service control point, wherein the service control point is functionally connected to the switch and the service circuit node, wherein the service control point includes a database of subscriber information including a list of telephone polling numbers corresponding to subscribers, and wherein the telephone polling method comprises the steps of:

receiving a call from a calling party made to the telephone polling number at the calling party's switch;

sending call identifying information associated with the call made to the telephone polling number from the switch to the service control point, said call identifying information including demographic information about the calling party; and at the service control point:

determining whether the call identifying information identifies a call made to the telephone polling number of a subscriber;

tabulating a response corresponding to the call made to the telephone polling number;

recording said demographic information; and sending instructions to the switch for handling the call made to the telephone polling number.

2. The method of claim 1, wherein the instructions sent to the switch by the service control point for handling the call made to the telephone polling number are call termination instructions, and wherein the switch, in response to the call termination instructions, disconnects the call made to the telephone polling number.

3. The method of claim 2, wherein the call termination instructions include an announcement instruction which causes the switch to play an announcement to the calling party prior to disconnecting the call made to the telephone polling number.

4. The method of claim 1, wherein the step of sending instructions to the switch by the service control point for handling the call made to the telephone polling number includes routing the call to a service circuit node, where said service circuit node, in response to the call termination instructions, plays an announcement to the calling party and disconnects the call made to the telephone polling number.

5. The method of claim 1, wherein the step of tabulating a response at the service control point further comprises:
    initiating a caller interaction program at the service control point, which program instructs the switch to play an announcement to the calling party which announcement asks the calling party to choose from a set of responses using the calling party's equipment; and
    receiving caller responses from the switch at the service control point.

6. The method of claim 1, wherein the step of tabulating a response at the service control point further comprises:
    initiating a caller interaction program at the service circuit node which plays an announcement to the calling party which announcement asks the calling party to choose from a set of responses using the calling party's equipment; and
    receiving caller responses at the service circuit node.

7. The method of claim 1, wherein the call identifying information includes an identity of the calling party and wherein the step of tabulating a response includes recording the identity of the calling party, determining from the identity of the calling party whether the calling party has called previously, and blocking tabulation of the response from the calling party if the calling party has previously called the telephone polling number.

8. The method of claim 1, wherein the step of tabulating a response further includes calculating a cumulative total and wherein the method further comprises the steps of transmitting the cumulative total to a service management system and allowing a subscriber corresponding to the telephone polling number to retrieve the cumulative total from the service management system.

9. The method of claim 1, wherein said step of recording said demographic information further comprises the steps of transmitting said demographic information to a service management system and allowing the subscriber corresponding to the telephone polling number to retrieve said demographic information.

10. A telephone polling method for tabulating calls made to a telephone polling number in an Advanced Intelligent Network, including a switch, a service circuit node, and a service control point, wherein the service control point is functionally connected to the switch and the service circuit node, wherein the service control point includes a database of subscriber information including a list of telephone polling numbers corresponding to subscribers, and wherein the telephone polling method comprises the steps of:
    receiving at a first switch a call from a calling party made to the telephone polling number at said first switch;
    routing said call to a second switch corresponding to said telephone polling number;
    assigning a terminating trigger to said telephone polling number at said second switch;
    in response to said terminating trigger, sending call identifying information associated with the call made to the telephone polling number from the second switch to the service control point; and
    at the service control point:
        determining whether the call identifying information identifies a call made to the telephone polling number of a subscriber;
        tabulating a response corresponding to the call made to the telephone polling number; and
        sending instructions to said second switch for handling the call made to the telephone polling number.

11. The method of claim 10, wherein the instructions sent to said second switch by the service control point for handling the call made to the telephone polling number are call termination instructions, and wherein said second switch in response to the call termination instructions, disconnects the call made to the telephone polling number.

12. The method of claim 10, wherein the call termination instructions include an announcement instruction which causes said second switch to play an announcement to the calling party prior to disconnecting the call made to the telephone polling number.

13. The method of claim 10, wherein the step of sending instructions to said second switch by the service control point for handling the call made to the telephone polling number includes sending call termination instructions to said second switch to route the call to a service circuit node where said service circuit node, in response to the call termination instructions, plays an announcement and disconnects the call made to the telephone polling number.

14. The method of claim 10, wherein the step of tabulating a response at the service control point further comprises:
    initiating a caller interaction program at the service control point, which program instructs said second switch to play an announcement to the calling party which announcement asks the calling party to choose from a set of responses using the calling party's equipment; and
    receiving caller responses from said second switch at the service control point.

15. The method of claim 10, wherein the step of tabulating a response at the service control point further comprises:
    initiating a caller interaction program at a service circuit node which program plays an announcement to the calling party which announcement asks the calling party to choose from a set of responses using the calling party's equipment; and
    receiving caller responses at the service circuit node.

16. The method of claim 10, wherein the call identifying information includes an identity of the calling party and wherein the step of tabulating a response includes recording the identity of the calling party, determining from the identity of the calling party whether the calling party has called previously, and blocking tabulation of the response from the calling party if the calling party has previously called the telephone polling number.

17. The method of claim 10, wherein the step of tabulating a response further includes calculating a cumulative total and wherein the method further comprising the steps of transmitting the cumulative total to a service management system and allowing the subscriber corresponding to the telephone polling number to retrieve the cumulating total from the service management system.

18. The method of claim 10, wherein the call identifying information includes demographic information about the calling party, and wherein said step of tabulating a response includes recording said demographic information.

19. The method of claim 18, wherein said step of recording said demographic information further comprises the steps of transmitting said demographic information to a service management system and allowing the subscriber corresponding to the telephone polling number to retrieve said demographic information.

20. A telephone polling method for tabulating calls made to a telephone polling number in an Advanced Intelligent Network, including a switch, a service circuit node, and a service control point, wherein the service control point is functionally connected to the switch and the service circuit node, wherein the service control point includes a database of subscriber information including a list of telephone polling numbers corresponding to subscribers, and wherein the telephone polling method comprises the steps of:

receiving a call from a calling party made to the telephone polling number at the calling party's switch;

sending call identifying information associated with the call made to the telephone polling number from the switch to the service control point; and at the service control point:

determining whether the call identifying information identifies a call made to the telephone polling number of a subscriber;

tabulating a response corresponding to the call made to the telephone polling number;

recording the identity of the calling party;

determining from the identity of the calling party whether the calling party has called the telephone polling number previously;

blocking tabulation of the response from the calling party if the calling party has previously called the telephone polling number; and     sending instructions to the switch for handling the call made to the telephone polling number.

* * * * *